United States Patent
Decker, Jr. et al.

(10) Patent No.: US 10,994,711 B2
(45) Date of Patent: May 4, 2021

(54) WIRELESS TOWED VEHICLE BREAKAWAY DETECTION AND ALERT

(71) Applicant: Danko Manufacturing LLC, Castle Rock, CO (US)

(72) Inventors: Daniel L. Decker, Jr., Castle Rock, CO (US); Jerad M. Burkhart, Castle Rock, CO (US)

(73) Assignee: Danko Manufacturing LLC, Castle Rock, CO (US)

( * ) Notice: Subject to any disclaimer, the term of this patent is extended or adjusted under 35 U.S.C. 154(b) by 9 days.

(21) Appl. No.: 16/203,959

(22) Filed: Nov. 29, 2018

(65) Prior Publication Data

US 2020/0172060 A1  Jun. 4, 2020

(51) Int. Cl.
| | | |
|---|---|---|
| *B60T 7/20* | (2006.01) | |
| *G07C 5/00* | (2006.01) | |
| *B60Q 1/30* | (2006.01) | |
| *B60D 1/36* | (2006.01) | |

(52) U.S. Cl.
CPC ............ *B60T 7/20* (2013.01); *B60D 1/36* (2013.01); *B60Q 1/305* (2013.01); *G07C 5/008* (2013.01)

(58) Field of Classification Search
CPC ........................................ B60T 7/20
USPC ............................................. 701/70
See application file for complete search history.

(56) References Cited

U.S. PATENT DOCUMENTS

| | | | | |
|---|---|---|---|---|
| 4,030,757 A | * | 6/1977 | Durling | B60T 13/263 303/28 |
| 4,405,147 A | * | 9/1983 | Horsman | B60D 1/06 280/442 |
| 5,477,739 A | * | 12/1995 | Holler | B60T 7/20 73/862.57 |
| 5,582,275 A | * | 12/1996 | Arnold | B60T 13/741 188/138 |
| 6,450,523 B1 | * | 9/2002 | Masters | B62D 13/005 280/423.1 |

(Continued)

FOREIGN PATENT DOCUMENTS

| | | | |
|---|---|---|---|
| CN | 109476196 A | * | 5/2016 |
| CN | 109476196 A | | 3/2019 |

(Continued)

OTHER PUBLICATIONS

Sun, X., Secure Vehicular Communications Based on Group Signature and ID-Based Signature Scheme, 2007 IEEE International Conference on Communications, Date of Conference: Jun. 24-28, 2007, ISBN: 1-4244-0353-7, DOI: 10.1109/ICC.2007.258 (https://ieeexplore.ieee.org/abstract/document/4288929)(pub. Aug. 13, 2007).*

(Continued)

*Primary Examiner* — Jean Paul Cass
(74) *Attorney, Agent, or Firm* — Loza & Loza, LLP; Gordon R. Lindeen (57) ABSTRACT

Breakaway detection and alerting is described for the breakaway of a towed vehicle. In one example, a system includes a breakaway detector attached to a towed vehicle to detect when a distance to a tow vehicle has exceeded a predetermined distance and to generate a breakaway detection signal and a wireless interface coupled to the detector to receive the breakaway detection signal and to transmit a wireless breakaway alert signal in response thereto.

22 Claims, 4 Drawing Sheets

(56) References Cited

U.S. PATENT DOCUMENTS

| | | | | |
|---|---|---|---|---|
| 8,662,262 | B1* | 3/2014 | Decker, Jr. | B60T 7/12 |
| | | | | 188/112 R |
| 9,399,448 | B1* | 7/2016 | Schuck | B60T 7/16 |
| 9,738,125 | B1 | 8/2017 | Brickley et al. | |
| 10,360,742 | B1* | 7/2019 | Bellas | G06Q 40/08 |
| 10,759,401 | B1* | 9/2020 | Hensley | B60T 8/172 |
| 10,850,715 | B1* | 12/2020 | Decker, Jr. | B60T 7/06 |
| 2001/0054524 | A1* | 12/2001 | Masters | B62D 53/0871 |
| | | | | 180/400 |
| 2003/0062767 | A1* | 4/2003 | Greaves, Jr. | B60T 17/223 |
| | | | | 303/123 |
| 2008/0258899 | A1* | 10/2008 | Stiles | B60Q 1/305 |
| | | | | 340/471 |
| 2014/0218522 | A1* | 8/2014 | Lavoie | G08G 1/167 |
| | | | | 348/148 |
| 2014/0222288 | A1* | 8/2014 | Lavoie | G06F 17/00 |
| | | | | 701/41 |
| 2015/0347959 | A1* | 12/2015 | Skaaksrud | H04W 8/24 |
| | | | | 705/333 |
| 2016/0137204 | A1* | 5/2016 | Morselli | F16H 61/18 |
| | | | | 701/54 |
| 2018/0148019 | A1* | 5/2018 | Graham | B60T 7/16 |
| 2018/0290635 | A1* | 10/2018 | Decker, Jr. | B60T 13/265 |
| 2019/0154439 | A1* | 5/2019 | Binder | G01S 15/08 |
| 2019/0302764 | A1* | 10/2019 | Smith | B62D 15/0285 |
| 2020/0057453 | A1* | 2/2020 | Laws | B60W 10/20 |
| 2020/0118361 | A1* | 4/2020 | Zula | G07C 5/0808 |
| 2020/0172060 | A1* | 6/2020 | Decker, Jr. | B60D 1/36 |

FOREIGN PATENT DOCUMENTS

| | | | |
|---|---|---|---|
| SE | 8007691 | * | 6/1982 |
| SE | 8007691 A | | 6/1982 |

OTHER PUBLICATIONS

Sun et al., Secure Vehicular Communications Based on Group Signature and ID-Based Signature Scheme, IEEE Conference Publication, added to IEEE Xplore Aug. 13, 2007, 15 pages.

* cited by examiner

FIG. 6

WIRELESS TOWED VEHICLE BREAKAWAY DETECTION AND ALERT

FIELD

The present description relates to detecting the breakaway of a towed vehicle and, in particular, to alerting the detected breakaway through a wireless interface.

BACKGROUND

It is often convenient to tow one vehicle behind another. In some cases, the towed vehicle can be a separate trailer. A heavy trailer typically provides a separate electric or hydraulic braking system that can be controlled by the tow vehicle through a standardized interface. The trailer's brakes can significantly reduce the stopping distance of the combination by aiding the tow vehicle in stopping the combination. Unlike a trailer, a typical towed vehicle, such as an automobile, a car, or a truck, does not have a trailer braking system interface. To reduce stopping distances, however, auxiliary braking systems have been developed to activate the towed vehicle's independent braking system. A particularly practical, convenient, and effective system rests on the floor of the vehicle in front of the driver's seat and pushes the brake pedal in proportion to when and how the tow vehicle brakes.

The towed vehicle is attached to the tow vehicle with a hitch. This attachment can fail for various reasons. While the likelihood of a towed vehicle becoming unhitched is very small, the damage that can be caused by a high speed unpiloted vehicle is very large. Most towing systems incorporate a breakaway system which will activate the towed vehicle's brakes if the towed vehicle separates from the tow vehicle. Typically, one end of a cable is attached to the tow vehicle and the other end of the cable is plugged into a socket that is attached to the towed vehicle. If the vehicles become too far separated, then the cable is pulled out of the socket at the towed vehicle. The unplugging action trips a switch that activates the brakes of the trailer or an independent system in the towed vehicle. The towed vehicle is therefore stopped by its own brakes reducing the damage that it can cause.

SUMMARY

Breakaway detection and alerting is described for the breakaway of a towed vehicle. In one example, a system includes a breakaway detector attached to a towed vehicle to detect when a distance to a tow vehicle has exceeded a predetermined distance and to generate a breakaway detection signal and a wireless interface coupled to the detector to receive the breakaway detection signal and to transmit a wireless breakaway alert signal in response thereto.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

A breakaway cable is a valuable safety device for any kind of towed vehicle. By activating the towed vehicle's brakes, the breakaway system provides great benefits in highway safety in the event that the towed vehicle breaks away from the tow vehicle. Unfortunately, to activate the brakes, the system must either connect to the brake system or to a braking actuator inside the vehicle. Both of these approaches require some modification to a vehicle which may be difficult, expensive or both.

Figure 1:
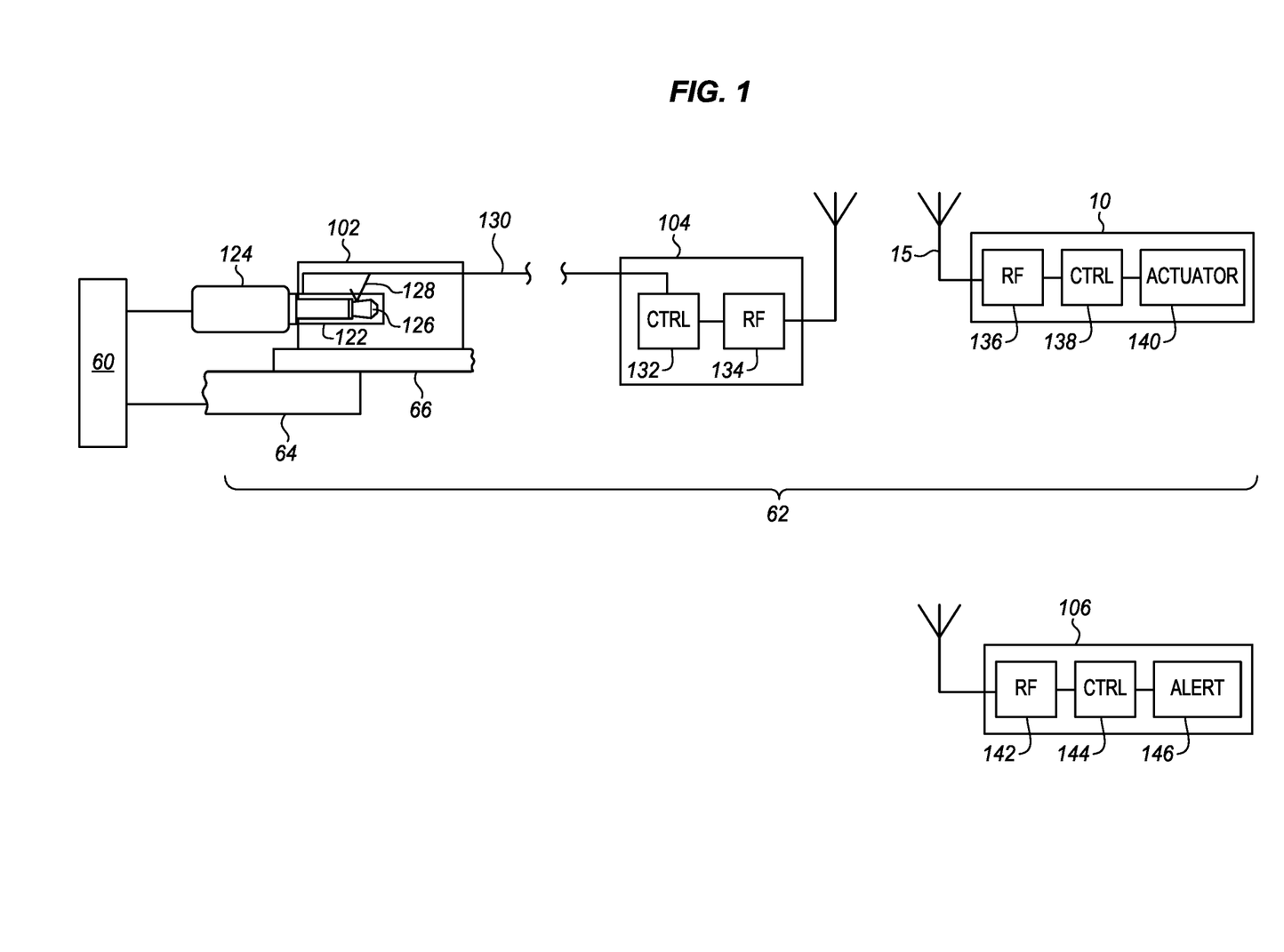
FIG. 1 is a diagram of a wireless breakaway detection and alert system according to embodiments of the present invention.

FIG. 1 is a diagram of components of a towed vehicle 62 that is being towed by a tow vehicle 60 using a hitch 64 attached to the tow vehicle and a tow bar 66 attached to the towed vehicle. The towed vehicle has a breakaway detector 102 with a breakaway cable 124 attached at one end to the tow vehicle and at the other end to the breakaway detector. The breakaway detector detects when the towed vehicle breaks away from the tow vehicle.

In this example, the breakaway cable has a plug 126 at the towed vehicle end. This plug is inserted into a socket 122 in the detector 102. The plug forms the blade of the switch that connects two contacts. The first contact 128 is a spring-loaded prong inside the socket 122. The second contact is at the base of the plug. The two make an electric connection through the plug. This plug closes a simple circuit between a pair of wires 130 that are connected to the socket. If the plug is removed from the socket, then the circuit is broken as the prong is no longer electrically connected to the socket base. In use, the plug is inserted into the socket by a user whenever the towed vehicle is hitched to the tow vehicle. It is removed by the user whenever the towed vehicle is disconnected from the tow vehicle hitch. The plug is also removed from the socket when the towed vehicle breaks away and moves farther from the tow vehicle than the length of the cable.

When the breakaway cable is removed from the socket or the cable pulls the plug out of the socket in any other way, then the switch attached to the socket is activated. The switch is connected to a wire connector. The connector is attached to an electrical cable that transmits the state of the switch activation to a wireless interface 104 as a breakaway detection signal. While a cable and socket are shown, there a variety of other possible breakaway detectors such as an electrical sensor to determine if the hitch is attached to the tow bar, a proximity sensor to detect the distance between the tow vehicle and the towed vehicle, or a strain gauge to determine when a breakaway cable has more than a predetermined amount of strain, among others.

The electrical cable 130 may be a simple pair of wires one connected to each side of the switch 128 in the breakaway detection socket 122. The wires are connected or disconnected together depending on whether the plug 126 is inserted into the socket. A more complex electrical transmission system may be used to convey the status of the switch. The status of the wire is then detected by the wireless interface 104. In this example, the switch status is received by a controller 132. The controller may have a pin (not shown) for each wire to determine whether the pins are shorted or not. Alternatively a single wire may be used as the switch activation breakaway detection signal. The wire may be high or low relative to vehicle ground to indicate the breakaway detection. In this case, only a single controller pin may be required.

The controller 132 generates a data packet suitable for wireless transmission in response to receiving the breakaway detection signal. The controller may have other inputs to determine whether or not to generate the data packet and any other parameters of the data packet to be generated. The controller than causes a connected wireless or radio frequency (RF) transceiver 134 to transmit a wireless breakaway alert signal in response to the breakaway detection signal. The transceiver can also be used to send and receive status, ready and similar types of signals when there is no breakaway condition.

In this example, the wireless interface 104 is shown as having a discrete and connected controller 132 and a wireless transceiver 134, such as a Wi-Fi transceiver module. These two components may be integrated into a single unit depending on the nature of the controller and any other tasks that the controller may perform. The transceiver may use Wi-Fi, Bluetooth, or any other wireless protocol on any suitable frequency. The transceiver can include modulators, up-converters, frequency generators, mixers, multiplexers, analog amplifiers and similar components.

The wireless interface 104 is also shown as separate from the breakaway detector 102. This allows the breakaway detector to be mounted in a suitable position for detecting a breakaway from the tow vehicle. As an example, the breakaway detector may be mounted on the towed vehicle bumper, tow bar, or another fixture at the front of the towed vehicle that faces the tow vehicle. The wireless interface may be located in a position that is better suited for wireless transmission or that is closer to a source of electrical power. As an example, the wireless transceiver may be located higher on the vehicle and away from sources of electrical interference. As an example, the wireless transceiver may be mounted on a fender near the vehicle battery.

The wireless breakaway alert signal can be received by any equipment that is configured to receive the signal. A primary example is a brake controller 10. The brake controller can be installed in the towed vehicle to actuate the vehicle brakes upon receiving the breakaway alert. As shown, the brake controller has an antenna 15 coupled to a Wi-Fi transceiver 136 that receives and demodulates the signal for a controller 138. The controller determines that the signal is a breakaway alert signal and then causes an actuator 140 to apply the brakes of the towed vehicle. The brake controller may be a part of an integrated braking system such as is common on a trailer or it may be a portable brake controller such as that shown in FIG. 3.

The wireless connection between the breakaway detector and the brake controller provides a significant cost and safety benefit compared to a wired connection. If the breakaway detector is on or near the front bumper of the towed vehicle and the brake controller is inside the towed vehicle near the vehicle brake pedal, then it is difficult to connect the two. One is inside the vehicle and the other is outside the vehicle. A hole must be made in the vehicle firewall or at some other place in the vehicle to connect a wire from the exterior detector to the interior controller. Making holes in firewalls can cause safety and integrity risks to the vehicle. It can also allow harmful fumes into the vehicle and void a vehicle warranty. When done properly, making the hole and sealing the hole is time consuming and uniquely adapted to suit each vehicle. This makes the installation costly. Accommodating different vehicles increases the cost of the installation. The wireless connection described herein avoids these costs and also allows the breakaway alert signal to be sent to multiple devices simultaneously.

Referring to FIG. 1, another device 106 is wirelessly connected to the wireless transceiver. This device may be a device that generates an alert to the driver of the tow vehicle. Alternatively, it may be a wireless hub that sends the signal to still more devices, or it may be any other type of device. In this example, the device has a wireless transceiver 142 to receive the wireless breakaway alert signal from the wireless interface 104. Like the brake controller, the transceiver can include analog amplifiers, de-multiplexers, downconverters, frequency generators, demodulators and similar components. The particular configuration and components of the transceiver and the controller may be modified to suit any particular implementation or the two components may be combined. This signal is then decoded by a controller 144 coupled to the wireless transceiver 142. The controller determines that the signal was a breakaway alert and then generates an alert 146 to alert the tow vehicle driver and any other suitable persons.

In some examples, this device is a tablet or other type of computing device near the driver in the front of the vehicle. The alert is an audible and visible signal generated by the tablet. A towed vehicle breakaway is an urgent emergency condition and the alert may be made noticeable to reflect the urgency of the situation. In another example, the device is a Wi-Fi hub located near the rear of the vehicle closer to the wireless interface 104 so that the wireless breakaway alert signal is easier to receive. The hub then generates an audible and visible alert and may send the emergency alert on to other devices to which it is wirelessly connected, such as a tablet or display near the tow vehicle driver.

While the present description is more directly related to the breakaway alert signal, the wireless transceiver 104 may send other signals to the brake controller and to other devices. As an example, there may be frequent interaction between the wireless transceiver and the brake controller to indicate status and to maintain the connection. The wireless transceiver can send a ready (RDY) or present (PR) signal at regular intervals. If the brake controller does not receive a ready signal or a present signal after a predetermined period of time, then the brake controller may generate an error signal to indicate that the breakaway signal is not operational.

The wireless communications paths may be configured in different ways. Higher security is provided when each device 10, 106 independently receives the breakaway alert signal from the wireless transceiver 104. This may be done using any of a variety of peer-to-peer protocols, such as Bluetooth, Wi-Fi direct, Tunneled Direct Link Setup (TDLS), or simpler direct communication connections. Wi-Fi Direct negotiates the link with a Wi-Fi Protected Setup system that assigns each device a limited wireless access point. The two access points can then be paired using typical button press or screen interface procedures. Alternatively, a near field communication (NFC), Bluetooth or other type of pairing signal may be used to conduct the pairing. Bluetooth is typically configured as a peer-to-peer system, but also requires a pairing operation as do many other communications systems.

The wireless transceiver 104 may alternatively be configured as a hub or access point to send signals directly to multiple nodes. Depending on the protocol, the alert may be sent simultaneously to all connected nodes. In another variation, the brake controller 10 or another device 106 may be configured as an access point or hub. The brake controller can then forward the alert to other nodes 106, 108 after receiving the alert from the wireless transceiver 104.

Figure 2:
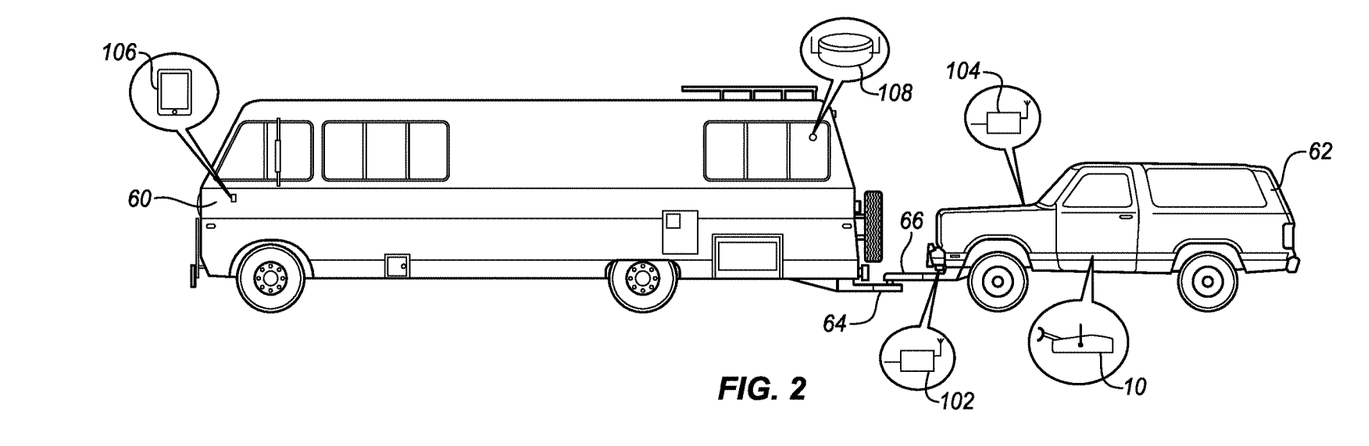
FIG. 2 is diagram of a tow vehicle and a towed vehicle suitable for use with embodiments of the present invention.

FIG. 2 is a diagram of a typical context in which a brake activation system such as that of FIG. 1 may be used. A tow vehicle 60 pulls a towed vehicle 62. In the illustration, the tow vehicle is a motor home and the towed vehicle is a light reconnaissance vehicle. However, the tow vehicle may be any type of car, truck, van, bus, or recreational vehicle and the towed vehicle may be any lighter vehicle with a conventional brake pedal activated system or a trailer with an integrated brake system controlled by the tow vehicle. The tow vehicle has a tow hitch 64 and the towed vehicle has a tow bar 66. The tow bar attaches to the hitch for towing. When the towed vehicle is unhitched for separate use, the tow bar is removed or folded out of the way.

Figure 3:
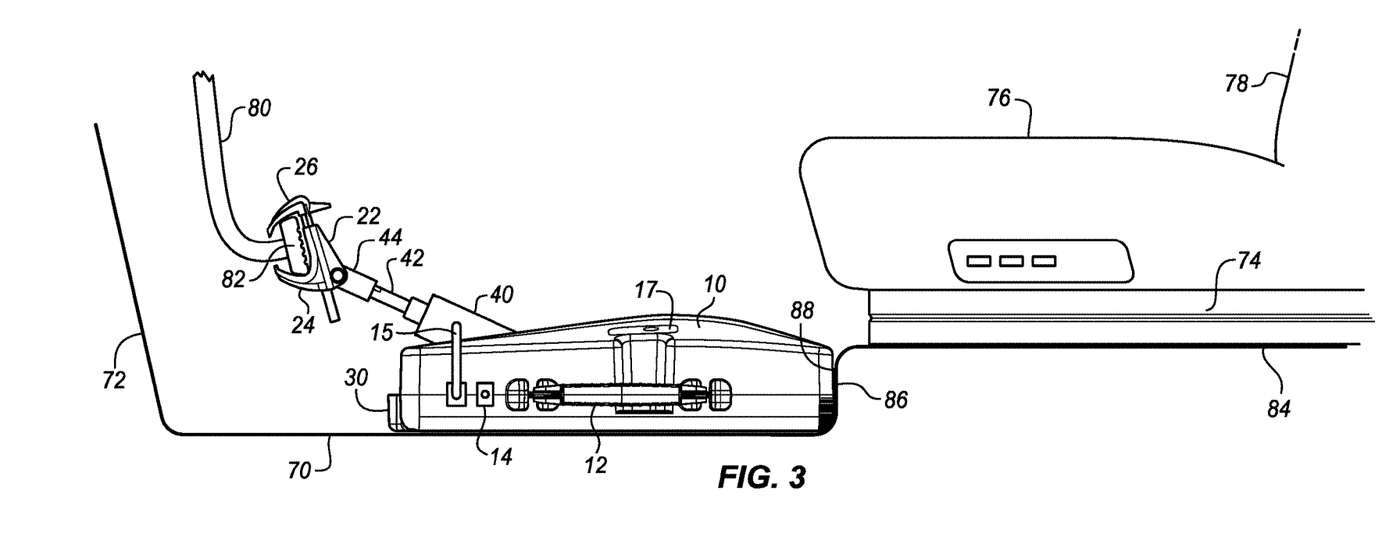
FIG. 3 is a side view of a brake controller installed inside a towed vehicle according to embodiments of the present invention.

The towed vehicle 62 has a breakaway detector 102 near the front bumper or tow bar 66 that is connected with an electrical cable to a wireless interface. The wireless interface is in another location under the hood. In some cases, the wireless interface may be near the battery in a position better protected from the road and from engine heat. A brake actuator 10 is on the floor of the vehicle in front of the driver's seat as shown in FIG. 3. The tow vehicle has an access point or hub 108 at the rear near the wireless interface 104 and the brake controller 10. The tow vehicle also has a display 106 near the driver that is coupled to the brake controller or the hub to display status information, such as a breakaway alert. This vehicle combination is provided as an example and there may be more or fewer components.

FIG. 3 is a diagram of an example of an interior driver's area of a towed vehicle. In FIG. 3, the towed vehicle interior has a floor pan 70 which is typically, but not necessarily carpeted. The floor pan extends forwards to a firewall 72, between the interior and the engine compartment. The floor pan extends rearwards to a seat platform 84. The seat platform carries a seat rail 74 which supports the driver's seat 76 and seat back 78.

A brake controller has a main housing 10 and a handle 12 to make it easy to carry and store. A safety socket 14 is provided for a connection to a breakaway detection signal electrical cable. The safety socket receives an electrical cable from the front bumper or other position at which the breakaway cable is connected. As an alternative or in addition, the brake controller has an antenna 15 to receive a wireless breakaway alert signal from a wireless transceiver 104 as described above. The antenna may also be used for communication with other nodes such as a display 106 and a hub 108.

The brake controller optionally also features a control panel 17 on an outer surface of the main housing 10. The control panel includes a start/stop button 18 and various status and control indicator lights 20. Additional buttons and indicators may also be used. The particular nature of the control panel may be modified for aesthetic or functional reasons. In one example, the control panel is a touch screen. In another example, physical switches may be used. A remote control panel screen may also or alternatively be used depending on the particular implementation, such as a touchscreen display 106. The system may also include a microphone or a speaker (not shown) to input commands or to receive confirmations and other signals. The speaker and lights may also be used to provide alerts such as a breakaway alert.

The floor pan has a ridge, or wall 86 at the edge of the seat platform. A back surface 88 of the brake activation system 10 is placed against this ridge. This helps to prevent the system 10 from moving backwards when the system presses against the brake pedal. Some vehicles have a flat floor pan in which the seat platform is not raised. In this case the back surface of the system 10 may rest against the driver's seat 76 or supporting seat rail 74. Alternatively, the system can rest on the floor pan without the back surface being braced against any surface or on the seat of the vehicle.

The vehicle interior also has a brake pedal 82 suspended from a brake pedal arm 80 used to activate vehicle's independent braking system. The brake pedal is typically coupled though the brake pedal arm to a hydraulic reservoir so that when the brake pedal is pressed brake fluid is pushed out of the reservoir to drive brake pads against rotors or drums to slow or stop the wheels. However, the invention is not limited to any particular configuration or operation of the vehicle's braking system.

In FIG. 3, a connector 22 is shown attached to the brake pedal 82. The connector base 24 curves around the back of the brake pedal and the connector upper grip 26 reaches around and over the top of the brake pedal. Both portions allow the brake pedal to be grasped from behind and also to be pushed from the front. In one example, the grip is pressed towards the base against the brake pedal and is then locked in place. In another example, a spring (not shown) drives the grip towards the brace. To attach the connector, the user pushes the grip away from the base, moves the base around the back of the brake pedal and then releases the grip. The spring drives the grip toward the base to apply pressure on the top and bottom of the brake pedal and hold the connector in place.

An actuation arm 42 is coupled to the connector with a pivoting connector 44 to allow the connector to conform to the angular position of the brake pedal. Since a brake pedal is typically mounted on a pivoting arm 80 with a pivot point (not shown) well above the floor pan, and the brake connector is mounted to an actuation arm with a pivot point on the brake activation system, as the brake pedal is pressed, it will rotate differently from the rotation of the brake connector. The pivoting connection 44 between the brake pedal connector and the actuation arm allows the connector to move as the angular position of the brake pedal changes. The pivoting connection (not visible) between the drive cylinder 40 and the main housing 10 allows the brake pedal connector to move up and down as the brake pedal is depressed. It also allows the system to be used with brake pedals at different distances and heights from the floor pan. A variety of other actuation arm configurations may be used to suit particular implementations.

The brake activation system may also include a radio frequency (RF) or remote communications subsystem (not shown). This subsystem is can be connected to an array of condition, operational and status sensors but may alternatively be coupled directly to the controller or to any other part of the system. This system may use any of a variety of wireless or wired standards for communication with remotely located devices. In one example, the RF subsystem receives commands and sends status messages to a control panel 106 in the tow vehicle that the tow vehicle driver can see and operate. The two-way connection may be used for a variety of different purposes and may be portable so that it may also be used in the towed vehicle for set up, diagnosis, and operation. In particular, if the brake sensor or any other sensor detects a fault, then the RF subsystem can send an alert to the remote control panel 106 in the tow vehicle and also activate any other alarms or alerts, such as on a brake controller housing control panel or using audible warnings.

The RF subsystem may also communicate with additional sensors at the hitch or in the tow vehicle to obtain additional brake activation information. The RF subsystem may also contain receivers for position information, and transmitters to send an alert if the towed vehicle is lost or stolen.

The system of FIG. 3 is provided as an example only. It may be modified in many different ways to suit different applications. More or fewer components may be used depending upon cost and accuracy constraints. In addition, additional components may be added to provide additional functions other than activating the braking system. Any type of drive may be used to press the arm against the brake pedal including a pneumatic arm drive a solenoid, an electromagnetic drive, a stepping motor, etc.

Figure 4:
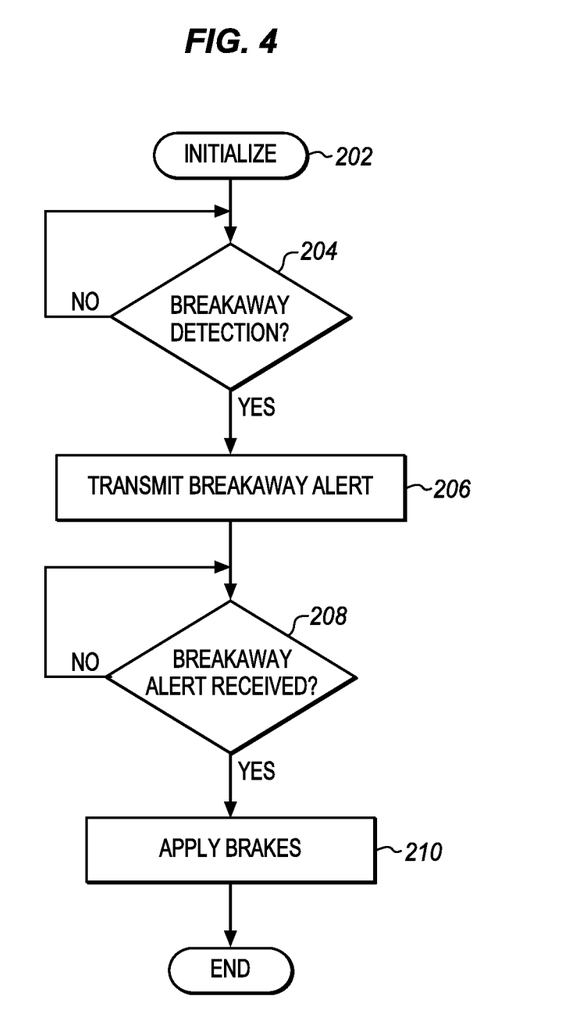
FIG. 4 is a process flow diagram of activating a brake controller in the event of a breakaway condition using a wireless connection according to embodiments of the present invention.

FIG. 4 is a simplified process flow diagram to show aspects of some of the described embodiments. At 202 the system is initialized. The particular operations for initialization depend on the particular implementation. In some examples, the towed vehicle is connected and the breakaway cable is attached to the towed vehicle. The system is then initialized by powering it on, by getting underway, by sending an activation command from a user interface or in any other way.

At 204, the breakaway detector determines whether breakaway is detected. If not, then no action is taken and the breakaway detector continues to wait until breakaway is detected. As mentioned above breakaway is detected by an excessive force on a cable, by the cable being removed, by an excessive distance being measured to the tow vehicle, or in any of a variety of other ways. If breakaway is detected then the process goes to 206. At 206 a breakaway alert is transmitted to a brake controller. At 208 the brake controller determines if it has received a breakaway alert. If it has not received a breakaway alert than it continues to wait. If it has received a breakaway alert then at 210 the brake controller applies the brakes. The process then ends. In many instances, the brakes will continue to be applied until the system is next initialized or disabled.

Figure 5:
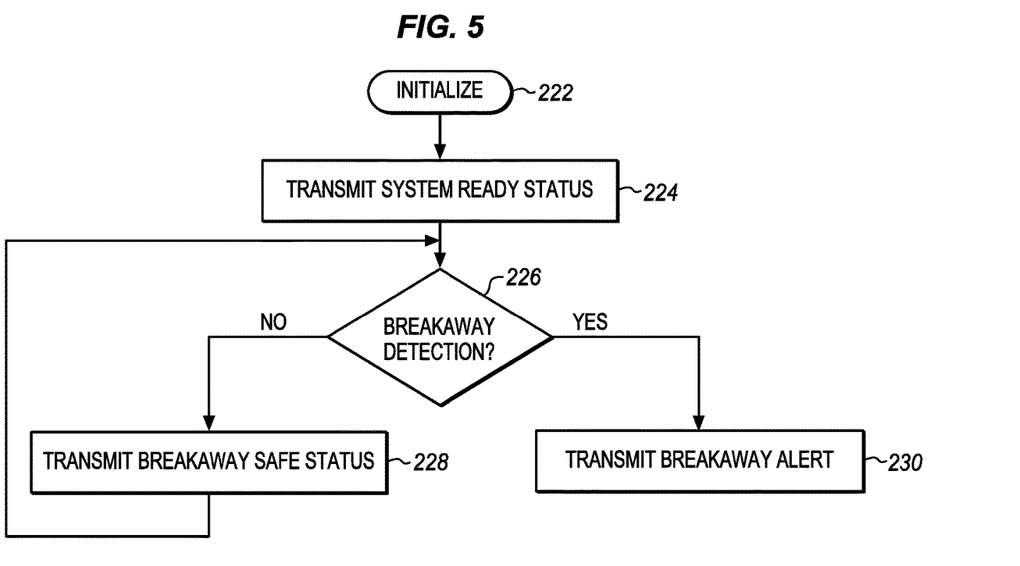
FIG. 5 is a process flow diagram of transmitting a breakaway detection signal in the event of a breakaway condition using a wireless connection according to other embodiments of the present invention.

FIG. 5 is an alternative process flow diagram to show additional operations that may be included. Additional operations not shown may be added and any one or more of the operations may be removed, depending on the implementation.

At 222, the system is initialized. All of the wireless transceivers are paired. The brake controller is installed into the towed vehicle and initialized. The towed vehicle is attached to the tow vehicle using a hitch, tow bar or any other suitable equipment. The breakaway cable is configured, for example by attaching one end to the tow vehicle and the other end to a breakaway detector. There may also be a variety of other system checks in the system at one or more of the components. If these are all good, then the installation and initialization is complete. The vehicle is ready for brake activation when being towed After initialization, the wireless transmitter may transmit a system ready status at 224 to any paired wireless devices. The ready status may be displayed on a user display, a brake controller, or any other suitable devices depending on the particular implementation.

At 226 the breakaway detector determines if a breakaway is detected, for example by the breakaway cable being removed. If there is no breakaway, then the detector causes the transmitter to send a breakaway safe status signal at 228. If there is a breakaway, then the detector causes the transmitter to send a breakaway alert signal at 230. The system may continue to send a breakaway alert signal until it is reset or loses power.

Figure 6:
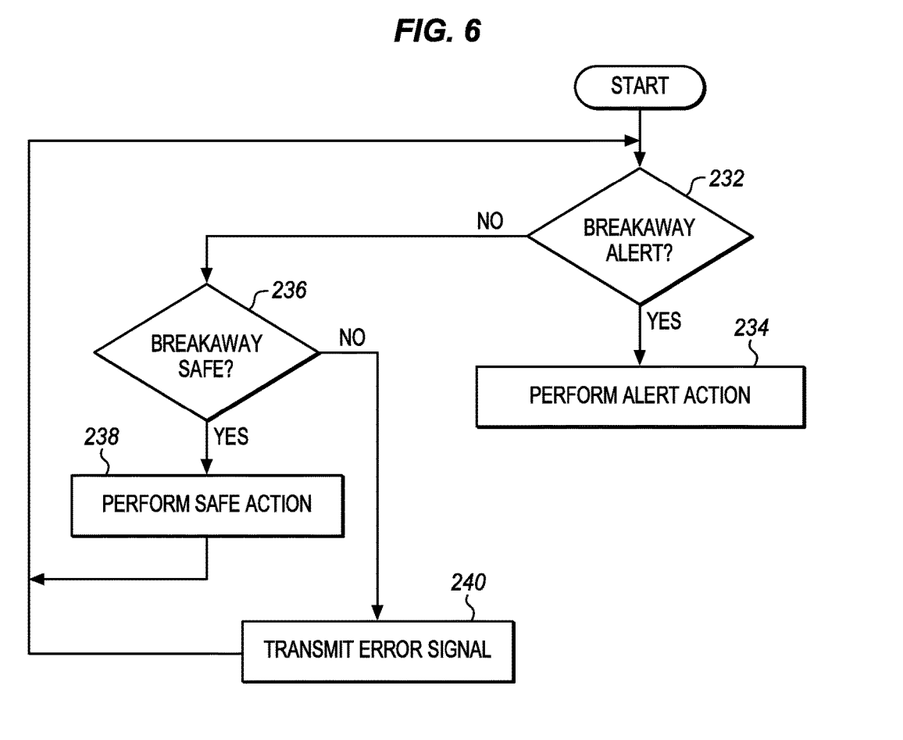
FIG. 6 is a process flow diagram of receiving a breakaway alert at a brake controller or other device according to embodiments of the present invention.

FIG. 6 is a process flow diagram for other devices that receive the safe and alert signals. Each such device will perform one or more alert actions upon receiving the breakaway signal. At 232 a device determines if the breakaway alert signal is received. If so, then the device performs any one or more alert actions at 234. This may include applying the towed vehicle brakes, if the device is a brake controller, issuing audible and visible alerts, or any other suitable action appropriate to such an emergency situation. The device may continue performing the action until it is reset or loses power or receives a confirmation from another device.

If there is no breakaway alert then at 236 the device determines whether there is a breakaway safe signal. If so, then any one or more breakaway safe actions may be performed at 238 such as generating an audible or visible safe signal or taking no action at all. The breakaway safe signal may take a variety of different forms, some of which are described above.

In some embodiments, the breakaway detector sends a ready or presence signal to the brake controller at regular intervals. The brake controller similarly replies to each signal. This signal from the breakaway detector can be the breakaway safe signal at 236. These signals verify the wireless connection between the two nodes. The status of the connection is verified as valid or connected. If after the regular interval, the brake controller does not receive the ready or presence signal, then the connection is invalid or has been broken or lost. Such a signal indicates a fault in the system and the brake controller sends an alert at 240 to the display directly or through the hub. The brake controller may also be configured to actuate the brakes of the towed vehicle.

Similarly, in some embodiments the brake controller sends a presence or ready signal to the hub. This signal may be the safe action 238 and verifies the wireless connection between the brake controller and the hub and that the brake controller is operating properly. If the hub does not receive this signal then an alert signal can be sent to the display and the hub may also generate an alert.

If there is neither an alert nor a safe signal from the breakaway detector at 236, then the device, e.g. the brake controller, may generate and may also transmit an error signal 240. The error would indicate that no signal is being received from the breakaway detection transmitter and that a fault needs to be corrected. The system may have various wait conditions before generating the error. The wait conditions can be determined based on how frequently the breakaway detection transmitter sends a signal.

The results of these and any other tests may be evaluated to determine whether the breakaway detection system is operating properly and if all of the components are installed correctly in the vehicle. The state of the system can be checked in other ways using any additional sensors. If the system initialization is not complete, if the transmitter is not operating, if the breakaway cable is not detected, or if the device receiver is not receiving a safe signal from the breakaway transmitter, then there is a fault and the process may return to the initialization operation by indicating one or more error status messages. A variety of different additional alerts may be provided, depending on the likely faults. The system may also provide specific information to guide the operator through a process of eliminating likely faults.

The alerts for any one or more of these faults as well as for a breakaway detection may be an audible warning from any of the devices, including the brake controller, flashing lights, a particular screen display, or some other alert. In addition alerts may be sent from one device to other devices. The brake controller may have a wireless connection directly or indirectly to another device that may serve as a display or a control panel. An alert may be sent to such a remote device in addition to or instead of the alert to the brake controller. This is particularly useful if an additional display is in the towing vehicle so that the driver knows to stop and attend to the emergency if the towed vehicle becomes disconnected and breaks away.

A lesser or more equipped brake activation system and wireless communication systems than the examples described above may be desirable for certain implementations. Therefore, the configuration of the system will vary from implementation to implementation depending upon numerous factors, such as price constraints, performance requirements, technological improvements, and/or other circumstances.

While the steps described herein may be performed under the control of a programmed processor, such as central processing unit, a microcontroller or by any programmable or hardcoded logic, such as Field Programmable Gate Arrays (FPGAs), TTL logic, or Application Specific Integrated Circuits (ASICs), for example. Additionally, the methods of the present invention may be performed by any combination of programmed general purpose computer components and/or custom hardware components. Therefore, nothing disclosed herein should be construed as limiting the present invention to a specific combination of hardware components.

The present description presents the examples using particular terms, such as towed vehicle, breakaway, breakaway detector, brake pedal, actuation arm, arm drive, sensor, switch, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

The present invention includes various steps, which can be performed by hardware components or can be embodied in machine-executable instructions, such as software or firmware instructions. The machine-executable instructions can be used to cause a general-purpose or special-purpose processor programmed with the instructions to perform the steps. The machine-executable instructions may be stored in a controller or in a separate memory. Alternatively, the steps can be performed by a combination of hardware and software.

Aspects of the present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A breakaway alert system comprising:
   a towed vehicle portable brake activation system configured to mount in an interior drivers' area of a towed vehicle and configured to be attached to a brake pedal of the interior driver's area of the towed vehicle, the portable brake activation system having an actuator to press against the towed vehicle brake pedal to activate the towed vehicle braking system;
   a wired breakaway detector configured to be attached to an exterior surface of the towed vehicle near a tow bar of the towed vehicle, the breakaway detector having a detector to detect when a distance to a tow vehicle has exceeded a predetermined distance and to generate an electric breakaway detection signal and having an electrical cable to indicate the electric breakaway detection signal;
   a wireless interface configured to be attached under a hood of the towed vehicle coupled to the electrical cable to receive the electric breakaway detection signal from the breakaway detector and having a wireless transmitter to transmit a wireless breakaway alert signal in response to receiving the electric breakaway detection signal;
   a wireless hub configured to be mounted in the tow vehicle, the wireless hub having a wireless transceiver to receive the wireless breakaway alert signal and to transmit the wireless breakaway alert signal to a wireless tablet; and
   the wireless tablet having a wireless transceiver to receive the wireless breakaway alert signal and to generate an alert to a driver of the tow vehicle,
   the portable brake activation system having an antenna configured to receive the wireless breakaway alert signal from the wireless interface transmitted using a peer-to-peer wireless transmission through a firewall between the wireless interface and the driver's area of the towed vehicle and to activate the towed vehicle braking system through the attached brake pedal in response to the wireless breakaway alert signal.

2. The system of claim 1, wherein the wired breakaway detector comprises:
   a socket to receive a breakaway cable attached to the tow vehicle;
   a switch attached to the socket to activate when the breakaway cable is removed from the socket; and a switch connector to transmit the switch activation through the electrical cable to the wireless interface as the breakaway detection signal.

3. The system of claim 2, the electrical cable having a pair of wires that are electrically connected or disconnected by the switch when the switch is activated.

4. The system of claim 3, wherein the wireless interface detects whether the pair of wires are electrically connected or disconnected and generates the breakaway alert signal in response to the detected condition of the pair of wires.

5. The system of claim 1, wherein the portable brake activation system comprises:
    an arm configured to be attached to a brake pedal of the towed vehicle;
    an arm drive system including a piston within a cylinder attached to the arm to press the arm against the brake pedal; and
    an air compressor to drive air into the cylinder in response to receiving the wireless breakaway alert signal.

6. The system of claim 1, wherein the portable brake activation system is configured to transmit the breakaway alert signal to a wireless tablet, the wireless table being portable for use near a driver of the tow vehicle.

7. The system of claim 1, wherein the wireless tablet is further to show a status to the tow vehicle driver when the wired breakaway detector detects that a breakaway cable is coupled to the wired breakaway detector.

8. A method comprising:
    detecting that a breakaway cable attached to a tow vehicle is coupled to a socket of a wired breakaway detector, the wired breakaway detector being attached to an exterior surface of a towed vehicle near a tow bar of the towed vehicle;
    sending a wired safe signal through an electrical cable attached to the wired breakaway detector from the wired breakaway detector to a wireless interface in response to the coupling of the breakaway cable, the wireless interface being attached under a hood of the towed vehicle and coupled to the electrical cable;
    wirelessly transmitting a wireless safe signal from a transceiver of the wireless interface in response to receiving the wired safe signal through the coupled electrical cable;
    detecting that the breakaway cable is not coupled to the socket of the wired breakaway detector;
    sending a wired breakaway detection signal to the wireless interface from the wired breakaway detector through the electrical cable in response to the breakaway cable not being coupled to the socket;
    wirelessly transmitting a wireless breakaway alert signal from the transceiver of the wireless interface in response to receiving the wired breakaway detection signal through the coupled electrical cable;
    receiving the wireless breakaway alert signal at a wireless hub configured to be mounted in the tow vehicle, the wireless hub having a wireless transceiver to transmit the wireless breakaway alert signal to a wireless tablet;
    receiving the wireless breakaway alert signal at the wireless tablet;
    generating an alert at the wireless tablet to a driver of the tow vehicle;
    receiving the wireless breakaway alert signal at a wireless transceiver of a towed vehicle portable brake activation system transmitted using a peer-to-peer wireless transmission through a firewall of the towed vehicle between the wireless interface and the portable brake activation system, the portable brake activation system being attached to a brake pedal of the interior driver's area of the towed vehicle; and
    applying brakes of the towed vehicle by the portable brake activation system through the brake pedal of the towed vehicle in response to receiving the wireless breakaway alert signal.

9. The method of claim 8, wherein applying brakes comprises pressing a brake pedal of the towed vehicle through an arm attached to the brake pedal and the portable brake activation system.

10. The method of claim 8, further comprising generating an audible alert signal at the portable brake activation system in response to receiving the wireless breakaway alert signal.

11. The method of claim 8, further comprising receiving the wireless safe signal at the wireless tablet and generating a safe indication on the wireless tablet in response to receiving the wireless safe signal.

12. A breakaway alert system comprising:
    a towed vehicle portable brake activation system configured to mount in an interior drivers' area of a towed vehicle and configured to be attached to a brake pedal of the interior driver's area of the towed vehicle, the portable brake activation system having an actuator to press against the towed vehicle brake pedal to activate the towed vehicle braking system;
    a wired breakaway detector configured to be attached to an exterior surface of the towed vehicle near a tow bar of the towed vehicle, the breakaway detector having a detector to detect when a distance to a tow vehicle has exceeded a predetermined distance and to generate an electric breakaway detection signal and having an electrical cable to indicate the electric breakaway detection signal; and
    a wireless interface configured to be attached under a hood of the towed vehicle coupled to the electrical cable to receive the electric breakaway detection signal from the breakaway detector and having a wireless transmitter to transmit a wireless breakaway alert signal in response to receiving the electric breakaway detection signal,
    the portable brake activation system having an antenna configured to receive the wireless breakaway alert signal from the wireless interface through a firewall between the wireless interface and the driver's area of the towed vehicle and to activate the towed vehicle braking system through the attached brake pedal in response to the wireless breakaway alert signal, wherein the portable brake activation system is configured to transmit the breakaway alert signal to a wireless tablet, the wireless tablet being portable for use near a driver of the tow vehicle, the tablet being configured to generate an audible and visible alert in response to the wireless breakaway alert signal.

13. The system of claim 12, wherein the wired breakaway detector comprises:
    a socket to receive a breakaway cable attached to the tow vehicle;
    a switch attached to the socket to activate when the breakaway cable is removed from the socket; and
    a switch connector to transmit the switch activation through the electrical cable to the wireless interface as the breakaway detection signal.

14. The system of claim 12, wherein the portable brake activation system actuator comprises a pneumatic piston within a cylinder attached to an arm to press the arm against the brake pedal.

15. The system of claim 12, further comprising a wireless hub configured to be mounted in the tow vehicle, the wireless hub having a wireless transceiver to receive the breakaway alert signal and to transmit the breakaway alert signal to the wireless tablet.

16. The system of claim 12, wherein the wireless tablet is further to show a status to the tow vehicle driver when the wired breakaway detector detects that a breakaway cable is coupled to the wired breakaway detector.

17. A method comprising:
   detecting that a breakaway cable attached to a tow vehicle is coupled to a socket of a wired breakaway detector, the wired breakaway detector being attached to an exterior surface of a towed vehicle near a tow bar of the towed vehicle;
   sending a wired safe signal through an electrical cable attached to the wired breakaway detector from the wired breakaway detector to a wireless interface in response to the coupling of the breakaway cable, the wireless interface being attached under a hood of the towed vehicle and coupled to the electrical cable;
   wirelessly transmitting a wireless safe signal from a transceiver of the wireless interface in response to receiving the wired safe signal through the coupled electrical cable;
   detecting that the breakaway cable is not coupled to the socket of the wired breakaway detector;
   sending a wired breakaway detection signal to the wireless interface from the wired breakaway detector through the electrical cable in response to the breakaway cable not being coupled to the socket;
   wirelessly transmitting a wireless breakaway alert signal from the transceiver of the wireless interface in response to receiving the wired breakaway detection signal through the coupled electrical cable; and
   receiving the wireless breakaway alert signal at a wireless transceiver of a towed vehicle portable brake activation system through a firewall of the towed vehicle between the wireless interface and the portable brake activation system, the portable brake activation system being attached to a brake pedal of the interior driver's area of the towed vehicle;
   applying brakes of the towed vehicle by the portable brake activation system through the brake pedal of the towed vehicle in response to receiving the wireless breakaway alert signal;
   transmitting the breakaway alert signal from the portable brake activation system to a wireless tablet, the wireless tablet being portable for use near a driver of the tow vehicle; and
   generating an audible and visible alert at the wireless tablet in response to the wireless breakaway alert signal.

18. The method of claim 17, wherein applying brakes comprises pressing a brake pedal of the towed vehicle through an arm attached to the brake pedal and the portable brake activation system.

19. The method of claim 17, wherein receiving the wireless breakaway alert signal at a wireless tablet comprises receiving the wireless breakaway alert signal from the portable brake activation system through a wireless hub in the tow vehicle.

20. The method of claim 17, further comprising receiving the wireless safe signal at the wireless tablet and generating a safe indication on the wireless tablet in response to receiving the wireless safe signal.

21. An apparatus comprising:
   means for detecting that a breakaway cable attached to a tow vehicle is not coupled to a socket of a wired breakaway detector attached to an exterior surface of a towed vehicle near a tow bar of the towed vehicle;
   means for sending a wired breakaway detection signal from the wired breakaway detector through an electrical cable to a wireless interface in response to the breakaway cable not being coupled to the socket, the wireless interface being attached under a hood of the towed vehicle and coupled to the electrical cable;
   means for wirelessly transmitting a wireless breakaway alert signal from a transceiver of the wireless interface in response to receiving the wired breakaway signal through the coupled electrical cable; and
   means for receiving the breakaway alert signal at a wireless transceiver of a portable brake activation system through a firewall of the towed vehicle between the wireless interface and the portable brake activation system, the portable brake activation system being attached to a brake pedal of the interior driver's area of the towed vehicle, and for applying brakes of the towed vehicle through the brake pedal of the towed vehicle in response to receiving the wireless breakaway alert signal;
   means for transmitting the breakaway alert signal from the portable brake activation system to a wireless tablet, the wireless tablet being portable for use near a driver of the tow vehicle; and
   means for generating an audible and visible alert at the wireless tablet in response to the wireless breakaway alert signal.

22. The apparatus of claim 21, further comprising means for receiving the wireless safe signal at the wireless tablet and generating a safe indication on the wireless tablet in response to receiving the wireless safe signal.

* * * * *